US007529763B2

(12) United States Patent
Hulse et al.

(10) Patent No.: US 7,529,763 B2
(45) Date of Patent: May 5, 2009

(54) SYSTEM AND METHOD FOR PROVIDING DYNAMIC CLIENT ARCHITECTURE IN AN APPLICATION DEVELOPMENT ENVIRONMENT

(75) Inventors: Bruce Hulse, Westford, MA (US); Igor Sherb, Natick, MA (US); Arkadi P. Popov, Sharon, MA (US); Miroslav Rapaic, Waltham, MA (US); Galen Fletcher Gawboy, Lexington, MA (US)

(73) Assignee: Parametric Technology Corporation, Needham, MA (US)

( * ) Notice: Subject to any disclaimer, the term of this patent is extended or adjusted under 35 U.S.C. 154(b) by 436 days.

(21) Appl. No.: 10/329,024

(22) Filed: Dec. 23, 2002

(65) Prior Publication Data

US 2004/0122861 A1 Jun. 24, 2004

(51) Int. Cl.
*G06F 17/30* (2006.01)
(52) U.S. Cl. .................. 707/102; 707/100; 707/101; 707/104.1; 717/107; 717/109; 717/120; 717/121; 717/137
(58) Field of Classification Search ......... 707/100–102, 707/104.1; 717/107, 109, 120–121, 136–137
See application file for complete search history.

(56) References Cited

U.S. PATENT DOCUMENTS 6,502,234 B1 * 12/2002 Gauthier et al. ............. 717/107
6,892,228 B1 * 5/2005 Penders ..................... 709/219
2002/0066074 A1 * 5/2002 Jabri ......................... 717/105
2002/0184610 A1 * 12/2002 Chong et al. ................ 717/109
2003/0023953 A1 * 1/2003 Lucassen et al. ............ 717/106
2003/0233631 A1 * 12/2003 Curry et al. ................. 717/100
2004/0010776 A1 * 1/2004 Shah ......................... 717/117

OTHER PUBLICATIONS

Rollins et al., "A Framework for Creating Customized Muti-modal Interfaces for XML Documents", IEEE International Conference on Multimedia and Expo (II), 2000, pp. 1-4.*

* cited by examiner

*Primary Examiner*—Khanh B Pham
(74) *Attorney, Agent, or Firm*—Lahive & Cockfield, LLP (57) ABSTRACT

A method of providing an application development environment that produces an application framework in a development language-neutral manner which is later adapted into a particular programming language based upon the identity of a requesting device and the requesting user is disclosed. Developers create an object-oriented framework describing the logical structure of an application without being restricted to a particular programming language. Requests from a requesting device for an application appropriate rendering are then processed by utilizing the framework as the basis for the application appropriate rendering written in a format appropriate for the requesting device. The application development environment of the present invention also automatically adapts the presentation for the requesting device according to the type of object being displayed, the role of the user who requests the application appropriate rendering, the type of application, the end user device, and the data volume. The storing of the application framework in a development language-neutral manner enables a high level of re-use of the application logic in adapting to programming requirements.

19 Claims, 6 Drawing Sheets

SYSTEM AND METHOD FOR PROVIDING DYNAMIC CLIENT ARCHITECTURE IN AN APPLICATION DEVELOPMENT ENVIRONMENT

THE FIELD OF THE INVENTION

The illustrative embodiment of the present invention relates generally to an application development environment, and more particularly to a dynamic client architecture which is development language-neutral and which may be adapted into an application in a specified development language in response to a user request.

BACKGROUND OF THE INVENTION

Applications are conventionally developed for a single programming language environment at a time. For example, web-based applications are written in HTML (Hyper Text Markup Language) which can be interpreted by a client web browser. C++ code is used to program applications to be executed by a C++ compiler. Java programs are written to execute on a Java compiler. If a target electronic device lacks the correct software to compile the source code, the code cannot execute. The requirement of designing programs specifically for a particular end platform cuts against one of the goals of object-oriented programming which is the re-use of modular components of code.

Unfortunately, most application development environments today only support the designing of an application in a specific development language. In order to port the application to a different language, the source code must be translated from one language to another and recompiled in the new language. An additional problem with conventional application development environments is that GUI elements must be specified by the developer for each data value. The GUI does not adapt to the data value. Similar problems exist in that actions associated with objects do not adapt to the GUI context. Actions are specified for the developer for each selected object.

Another problem with traditional application development environments is that applications are not custom designed based upon the identity of the end user. For example, access to an application may be controlled based on access privileges (e.g.: an administrator may access certain applications to which a regular user lacks access), but the application itself does not change based upon the role of the user. The set level of access to an application results in a uniform level of access that may not be appropriate for all users. For example, there may be no need to display certain company information to outside sales representatives running an application whereas full-time employees may need access to the information.

BRIEF SUMMARY OF THE INVENTION

The illustrative embodiment of the present invention creates a dynamic client architecture which can be used as the framework for applications written in multiple programming languages. Developers specify the logical structure of an application in a development language-neutral manner. The application framework is then utilized to create an application appropriate rendering in a particular language based upon a request from a client device. An application appropriate rendering is a presentation prepared for the requesting device in a language appropriate for an application environment on the requesting device/target platform. An example of an application appropriate rendering is the production of a web page created from the application framework for a requesting client device equipped with a web browser or the production of C++ source code generated from the application framework for presentation to a requesting client device equipped with Visual Studio™ from Microsoft. A configuration repository includes the application elements needed by a developer to put together the application appropriate rendering. The developer uses the configuration repository to specify the framework elements in XML (Extensible Markup Language) or some other development language-neutral manner. The developer may specify associations between GUI elements and object data properties. Associations may also be specified between actions and GUI elements in the framework. Additionally, application elements may be linked with the role of the requesting user. When a request from a client device for an application appropriate rendering is received, the application framework is retrieved. An appropriate development language is determined for the client device and a dedicated rendering subsystem for that client device produces the application appropriate rendering for the requesting device.

In one embodiment, an application development system includes a configuration repository. The configuration repository defines the framework of an application in response to input from a developer. The application framework is development language-neutral. The application development system also includes a data acquisition and manipulation subsystem to acquire data used by the application appropriate rendering and to retrieve necessary framework elements. Also included in the application development system is a rendering subsystem which produces an application appropriate rendering in a development language appropriate for a requesting device. The rendering subsystem uses the application framework to create the application appropriate rendering.

In another embodiment, a method is disclosed for providing an application appropriate rendering to an application development environment. Development language-neutral application framework elements are defined in a configuration repository. At least one application framework element is defined to create an application framework. The application framework is then stored for later retrieval. In one aspect of the embodiment, a request is received from a requesting device for an application appropriate rendering in a specified development language. The application framework and data are retrieved with a data acquisition and manipulation subsystem. The retrieved framework and data are used to create an application appropriate rendering in the specified development language for the requesting device.

In an embodiment of the present invention, development language-neutral application framework elements are defined and stored in a configuration repository. Data is retrieved with a data acquisition and manipulation subsystem and a framework is created using the retrieved data and the framework elements. The framework that is created is developmental language neutral. The application framework is stored and later retrieved and used to create an application in a specific language based on a request.

DETAILED DESCRIPTION

The illustrative embodiment of the present invention provides an application development environment that produces an application framework in a development language-neutral manner which is later adapted into a particular programming language based upon the identity of a requesting device and the requesting user. Developers create an object-oriented application framework. The framework describes the logical structure of an application appropriate rendering without being restricted to a particular programming language. Requests from a device for an application appropriate rendering are then processed by utilizing the framework as the basis for the application appropriate rendering. The rendering is produced in in a format appropriate for the requesting device. The application development environment also automatically adapts the presentation according to a number of factors, such as the type of object being displayed, the role of the user who requests the application, the application type, the end user device, and the data volume. The storing of the application framework in a development language-neutral manner enables the a high level of re-use of the application logic in adapting to programming requirements.

Figure 1:
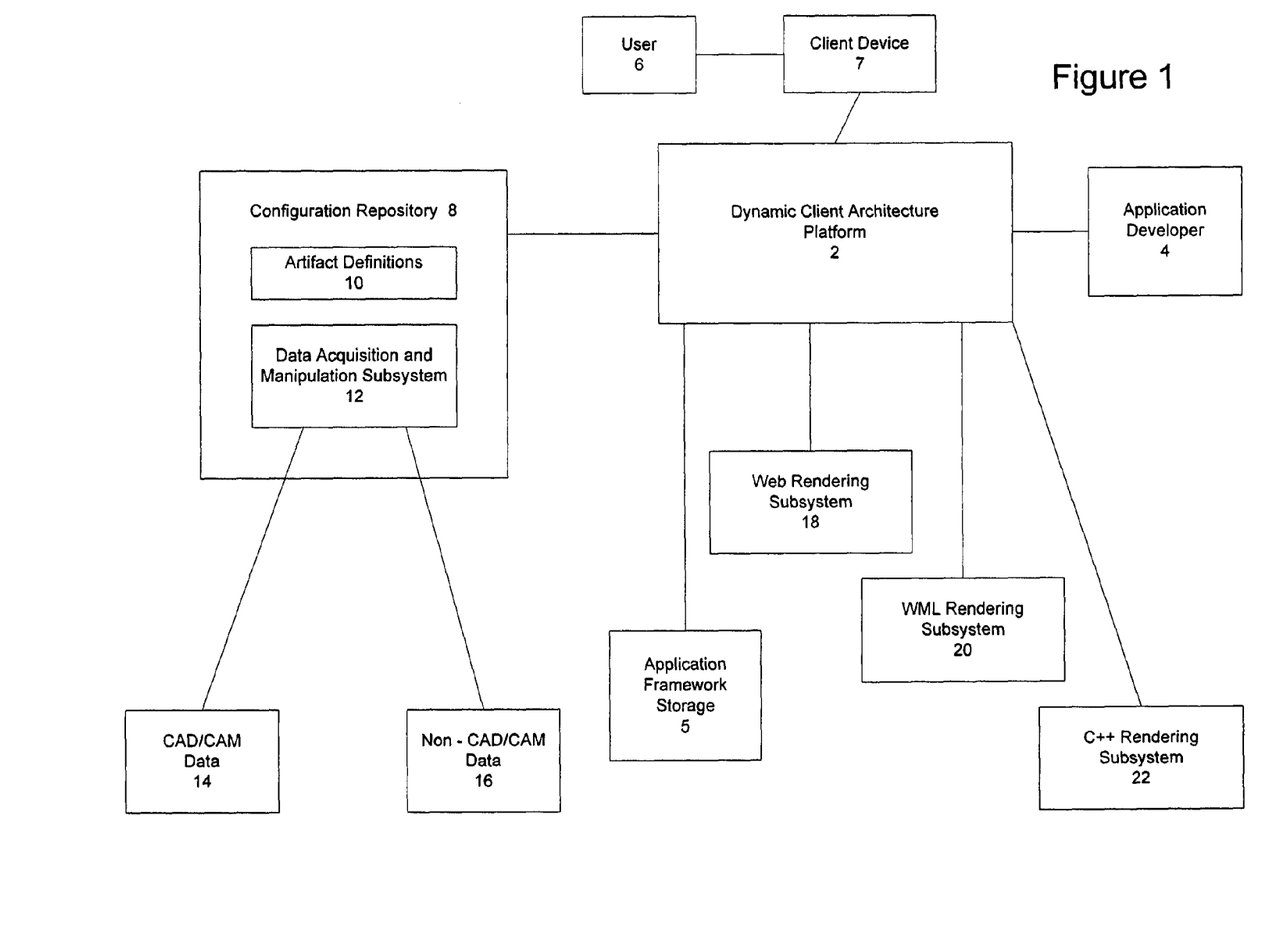
FIG. 1 depicts an environment suitable for practicing the illustrative embodiment of the present invention.

FIG. 1 depicts a block diagram of an environment suitable for practicing the illustrative embodiment of the present invention. A dynamic client architecture (DCA) platform 2 is used by developers 4 and users 6 to create and request application appropriate renderings using the present invention. The DCA platform 2 is software and may be located on a networked electronic device or on a stand-alone computer or electronic device. The electronic device may be a server, workstation, laptop or any electronic device suitable for a user to perform application development. The DCA platform 2 has access to a configuration repository 8. The configuration repository 8 is a storage location holding application framework elements. The configuration depository, 8 is developmental language-neutral and holds a number of artifact definitions 10 for high level application elements. The term development language-neutral is explained further below. The high level artifact definitions 10 held by the configuration depository 8 include frames, trees, tables, property panels, and wizards which are available to be selected by an application developer 4 to create the application framework.

The configuration repository 8 is development language-neutral in that the application framework elements are stored as base classes in a programming language such as Extensible Markup Language (XML) that may be utilized to produce applications written in other languages. The base classes may be abstract base classes in which objects of the base class are never instantiated but are designed to have object attributes and functions overwritten by child objects inheriting from the parent class. A child class inherits the attributes (such as data variables) and functions of the parent class but may have additional attributes and functions in addition to those of the parent class. The Extensible Markup Language (XML), was developed to provide greater flexibility than HTML (Hypertext Markup Language) for applications utilizing electronic documents. HTML is a markup language that encodes a document via the use of tags and attributes. Tags appear between < > brackets, and attributes are specified in the form of "name=value". HTML specifies the meaning of each tag and attribute and how text located between tags and/or attributes will appear. An example is a tag <p> which designates the beginning of a new paragraph. A corresponding tag </p> designates the end of the paragraph. HTML documents are typically interpreted by HTML interpreters found in web browsers. Similar to HTML, XML is a markup language that uses tags and attributes, but unlike HTML, XML uses tags only to delimit pieces of data. The interpretation given to the meaning of the data is left up to the application that reads the data. As noted above, the tag <p> in HTML specifies that a new paragraph is needed, whereas the tag <p> in XML has an application specific meaning. This flexibility allows applications making use of the data to interpret the data in different ways.

The developer 4 uses the DCA platform 2 to access the configuration repository 8 (which is XML-based in the illustrative embodiment of the present invention but may be based on another development language-neutral language) to define logical aspects of an application. As noted previously, the configuration repository 8 includes artifact definitions such as frames, trees, tables, property panels and wizards. Within the high level artifacts are other artifacts which define how the high level artifacts get configured, including layout and data binding. The configuration repository 8 is a highly object-oriented subsystem which emphasizes the use of inheritance to re-use already defined objects. The configuration repository 8 defines binding to the data access and manipulation sub-system, a set of defined patterns for interaction between the presentation elements and the data access system, a set of pre-defined handlers for manipulating the attributes and a set of pre-defined renderers for producing consistent user model behavior in the user interface such as an HTML UI. The configuration repository 8 also defines multiple customization points that allow the introduction of new object behaviors to extend the rendering of a particular application and a methodology for implementing applications that are tailored to the specific type of user executing the application.

The configuration repository 8 is made up of several major sub-components. One sub-component is the Application Composition sub-component which includes application composition elements. The application composition elements sew together other elements in the configuration depository into a consistent and coherent set of behaviors for a particular type of user. These composition elements are primarily application-specific menus accessed via a navigation bar. It also includes the creation of specific application-based groupings such as a list of object types against which a search operation can be performed (usually displayed as a pulldown list in a search page).

Another sub-component in the configuration repository 8 is the Object Specifications sub-component. The Object Specification sub-component includes the definition of the object itself (for instance, wt.part.WTPart is to be known to the end user as Part), the definition of all properties that comprise the object (for instance, name, number, and create date), the behaviors expected from that property (string, integer, size/range constraints, URL, etc.) and finally the server attribute name to which this property binds.

An additional sub-component in the configuration depository 8 is the sub-component holding frame (page/dialog) specifications. The specifications define the pages to be presented to the end user for interaction. The specifications include the various layout components (tables, property panels, wizards, trees, layouts, layoutrows, and column definitions). Layout components are selected by the application developer and the selections are stored in the application framework. The conceptual definitions are transmitted to the rendering layer to produce a consistent, usable user interface in response to a request for an application appropriate rendering by a client device.

The Data Acquisition Bindings sub-component (depicted as the data acquisition and manipulation subsystem 12 in FIG. 1) is used to allow the DCA platform 2 to communicate to one or more servers in order to manipulate the data provided by the end user. Data acquisition binding is performed through the use of various "Doers" classes which work on behalf of the application framework. Model Doers are used to get and put data to and from back-end environments. By producing multiple Doers, it is possible to communicate with multiple back-end systems. By producing the proper Doer, one can communicate with an EAI (Enterprise Application Integration) tool to access any of the servers to which it provides access. ActionDoers are used to wire up the various UI components to provide interaction with the server (such as the OK button in a create dialog). ClientDoers are used to wire up the various UI components to provide interaction at the "client" level, such as tree expand/collapse operations or cut and copy operations. This distinction of a separate class of ClientDoers is made to guide rendering layer implementers, as ClientDoers may in some implementations reside away from the server (a Java Client would handle it's own clipboard, while the HTML client still relies on the web server/Servlet engine to manage the clipboard).

An example of the use of the configuration repository 8 and the various subcomponents is illustrated below in a sample configuration file for a simple table definition for the object type wt.lifecycle.LifeCycleTemplate. The table definition displays the name and description attributes for every defined instance of that object type in the system. Those skilled in the art will note in the file the lack of API calls to obtain object attributes, the lack of pixel locations in any of the layout definitions, and the way in which components like "table" are defined one time and are then available for uses in multiple page definitions. For instance, there would be no reason to define a different table definition for this object type for use in a search page or a item picker popup page. This one table definition would suffice.

```
<?xml version="1.0" standalone="no"?>
<!-- <!DOCTYPE LogicRepository SYSTEM "/config/dtd/TestRepository.dtd"> -->
<Repository package="com.ptc.lifecycles">
<Import package="com.ptc.common"/>
    <!-- ======Synonyms used to avoid repeated WCTYPE strings ========-->
    <Context>
        <Synonym id="TARGET_OBJECT" value="wt.lifecycle.LifeCycleTemplate"/>
        <Synonym id="LABEL" value="Lifecycles"/>
        <Synonym id="TOOLTIP" value="Windchill Lifecycle Templates"/>
    </Context>
    <Context>
    <!-- Frame for the table output -->
        <SimpleFrame id="main" type="%[TARGET_OBJECT]">
            <Extend ref="simpleframe.template"/> <!-- Start this Frame by extending from the
template -->
            <Label resource="%[LABEL]"/>
            <ToolTip resource="%[TOOLTIP]"/>
            <Layout>
              <LayoutRow id="row5">
                <Insert ref="table"/>
              </LayoutRow>
            </Layout>
        </SimpleFrame>
    <!-- This includes the CSS and Javascript package into the page -->
        <SimpleFrame id="simpleframe.template" separatorType="horizontal">
            <Insert ref="frame.header.link.css"/>
            <Insert ref="frame.header.script.javascript"/>
        </SimpleFrame>
        <!-- This is the special element that includes a CSS stylesheet into the page -->
        <Link id="frame.header.link.css"
resource="wtcore/css/com/ptc/core/ca/web/misc/DCADefault.css">
            <ModelHandler
class="com.ptc.core.ca.co.client.frame.CoHeaderResourceModelHandler"/>
            <Renderer resource="/wtcore/jsp/com/ptc/core/ca/web/frame/cssLink.jsp"/>
        </Link>
        <!-- This is the special element that includes a Javascript package into the page -->
        <Script id="frame.header.script.javascript"
resource="wtcore/js/com/ptc/core/ca/web/misc/main.js">
            <ModelHandler
class="com.ptc.core.ca.co.client.frame.CoHeaderResourceModelHandler"/>
            <Renderer resource="/wtcore/jsp/com/ptc/core/ca/web/frame/script.jsp"/>
        </Script>
    </Context>
    <Context type="%[TARGET_OBJECT]">
        <!-- Property definitions -->
```

-continued

```
    <!-- NOTE: This is normally done with the following pattern to avoid duplicating the
definitions hundreds of times
        <Property id="name">
        <Extend ref="property.name.template"/>
        </Property>
    -->
    <Property id="name">
        <PropertyHandler
class="com.ptc.core.ca.web.client.property.string.WebStringPropertyHandler"/>
        <Renderer resource="/wtcore/jsp/com/ptc/core/ca/web/property/string/string.jsp"/>
        <Label resource="Name:"/>
        <Need attribute="name"/>
    </Property>
    <Property id="description">
        <PropertyHandler
class="com.ptc.core.ca.web.client.property.string.WebStringPropertyHandler"/>
        <Renderer resource="/wtcore/jsp/com/ptc/core/ca/web/property/string/string.jsp"/>
        <Label resource="Description:"/>
        <Need attribute="description"/>
    </Property>
  </Context>
<!--
This is where the linkage between the task and the table is defined
Add the necessary SimpleColumn elements for the attributes of the object to be retrieved
to the SimpleTable definition.
Add the necessary TaskParameter elements to the Task element
-->
  <Context>
    <SimpleTable id="table" selectorType="multi">
        <Type type="%[TARGET_OBJECT]"/>
        <!-- show="name" will go looking for an id of a displayable element called name.
                    For example, look for a Property -->
        <SimpleColumn show="name">
            <Label resource="Name"/>
        </SimpleColumn>
        <SimpleColumn show="description">
            <Label resource="Description"/>
        </SimpleColumn>
        <!-- Add more SimpleColumn elements if desired -->
        <ModelDoer id="table.model.doer" resultSetType="multiple"
class="%common:SimpleModelTaskDoer">
            <Task nextOperation="STDOP|com.ptc.windchill.view" taskDelegate="dca-get-
objects">
                <!-- This defines the type of object to be retrieved for the table -->
                <TaskParameter name="dca_type" value="%[TARGET_OBJECT]"/>
            </Task>
        </ModelDoer>
    </SimpleTable>
  </Context>
</Repository>
```

The developer 4 may access the DCA platform 2 through a graphical user interface homepage. The developer 4 selects an option displayed on the user interface to create an application framework which may be used to create an application appropriate rendering at a later time. For example, the developer 4 may select an option to create a CAD model for a new part. The developer 4 is presented with fields in which to specify application components. The specified components are defined in the configuration repository 8. For example, the developer looking to implement a create part screen for an engineer running an application may specify that nine specific fields be captured from the user and further specify the rough layout of the fields. The implementation of the components is handled by the rendering system for the target platform. The collection of specified components is saved as a development language-neutral application framework which may be used to satisfy a subsequent user request.

The DCA platform 2 also has access to a data acquisition and manipulation subsystem 12. The data acquisition and manipulation subsystem 12 has access to a number of data storage locations including a CAD/CAM data location 14 and a non-CAD/CAM data location 16. The data acquisition and manipulation subsystem 12 is used to retrieve data for use with the application framework produced by the DCA platform 2. Also interfaced with the DCA platform 2 are a number of target platform-specific rendering subsystems including an HTML web rendering subsystem 18, a WML (Wireless Markup Language) rendering subsystem 20 and a C++ rendering subsystem 22. The rendering systems convert the high level components specified in the application framework into the appropriate language for a target platform. The high level components specified in the application framework are replaced by low-level GUI components. For example, controls such as drop down lists, radio buttons and dialog boxes may be used to implement the components specified by the developer in the application framework. The web rendering subsystem 18 is used to convert data retrieved by the data acquisition and manipulation subsystem 12 into HTML source code (as indicated by the stored application framework) for return to a web browser when the requesting user 6 is requesting an HTML application. Similarly, the WML rendering subsystem 20 is used to convert the data retrieved by the data acquisition and manipulation subsystem 12 into source code which may be compiled into a WML application suitable for a requesting WML capable device. Likewise, the C++ rendering subsystem 22 is used to convert the data retrieved by the data acquisition and manipulation subsystem 12 into a form capable of being rendered by a C++ rendering subsystem. Those skilled in the art will recognize that there are a number of target platforms beyond those depicted here and each target platform will have its own rendering subsystem to convert the data into an appropriate format for the requesting client device.

Figure 2:
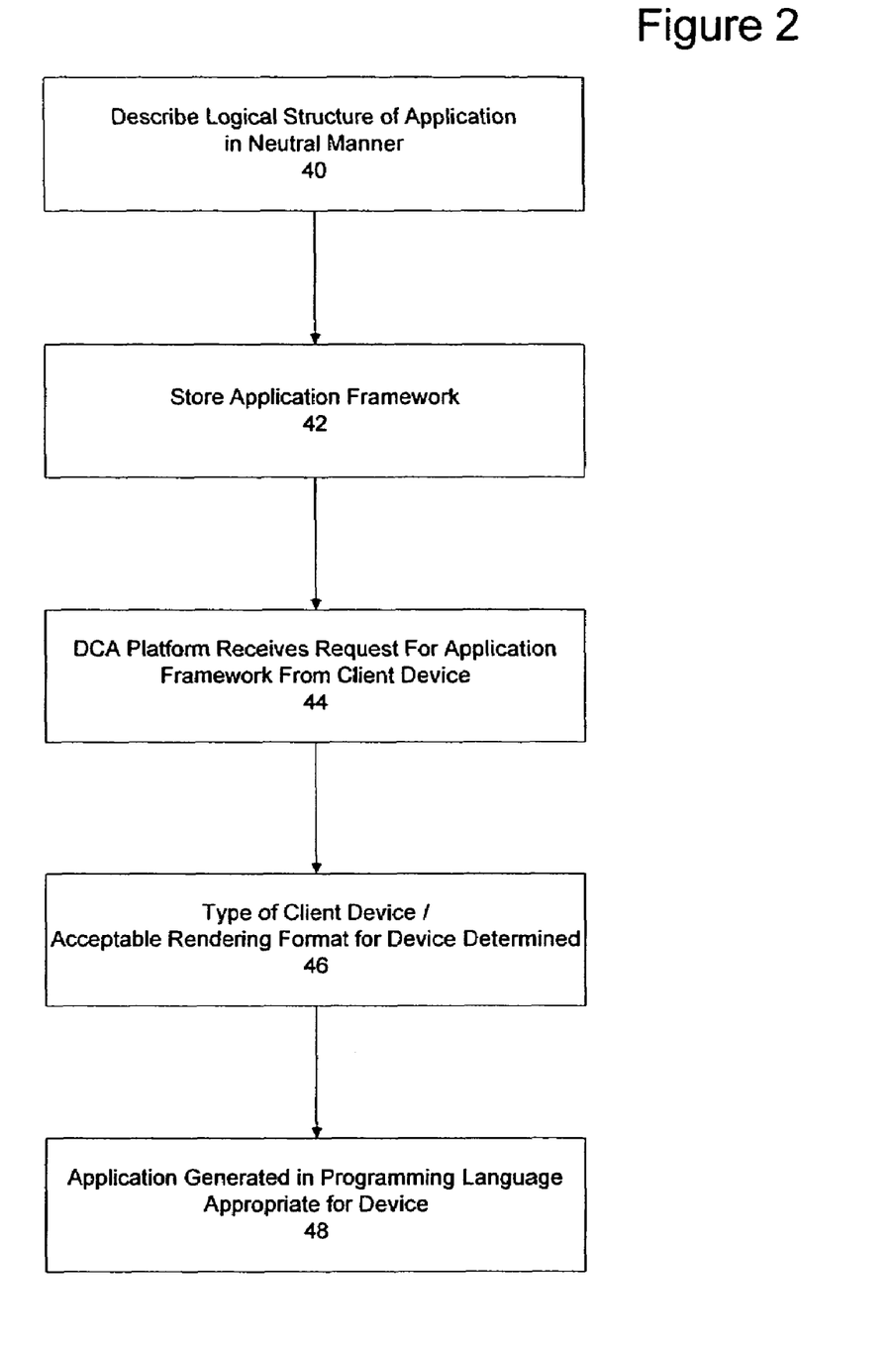
FIG. 2 depicts the sequence of steps followed by the illustrative embodiment of the present invention to associate object properties with GUI elements in the application framework.

FIG. 2 depicts the sequence of steps followed by the illustrative embodiment of the present invention to determine the proper development environment for the created application appropriate rendering. The sequence begins when the developer creates the application framework by describing the logical structure of the application in a neutral manner (step 40). The application framework is then stored (step 42). Subsequently, the DCA platform 2 receives a request for an application appropriate rendering from a user 6 through a client device 7 (step 44). The DCA platform 2 determines the type of device making the request by examining the request and consults a record of compatible formats for the device (step 46). For example an HTTP (Hyper Text Transfer Protocol) request would indicate that an HTML-based application appropriate rendering could be returned to the requesting device. Similarly, a WML (Wireless Markup Language) request would indicate that a WML based application appropriate rendering should be returned. The DCA platform 2 uses the appropriate rendering subsystem to convert the data into the proper format for use with the application framework and the resulting application appropriate rendering is returned to the requesting client device 7 (step 48).

The illustrative embodiment of the present invention allows a high level of re-use of the application logic embodied in the application framework. One of the ways this is accomplished is by associating GUI display elements with base class object properties. When the base class is inherited by a child class and data retrieved for the new class member, the association of the GUI display element is also retrieved by the new object. For example, a base class object may have a property such as an employee number for which an application developer 4 indicates that whatever data value is retrieved for that property should be associated with a table cell. When an application appropriate rendering is being created, a child class object may inherit the attributes and properties of the parent class. Upon retrieval of a data value for an instantiated member of the child class, the data value representing the employee number is plugged into a table cell being displayed in the rendering for the requesting user. Since the display element is tied to the base class rather than to the individual data in the instantiated child class, the developer does not need to re-specify the GUI element each time new data is retrieved. Referring to FIG. 1, the data being retrieved by the illustrative embodiment of the present invention may be CAD/CAM data 14 or non-CAD/CAM data 16 retrieved from a storage location accessible to the data acquisition and manipulation subsystem 12 of the DCA platform 2.

The illustrative embodiment of the present invention enables the creation of application appropriate renderings for many different types of target platforms from a single stored application framework. For example, in an HTML environment, a user performing CAD operations invokes a particular gateway URL and indicates a starting home page alias as part of the URL. The use of this particular gateway triggers the DCA platform to recognize the target platform as an HTML browser. The page request is processed by the DCA Platform, the data from the data acquisition system is acquired, and the Web rendering layer produces HTML output. In a WML environment, the user invokes a particular gateway URL and indicates a starting home page alias as part of the URL. The use of this particular gateway triggers the DCA platform to recognize the target platform as a WML browser. The page request is processed by the DCA Platform, the data from the data acquisition system is acquired (in an identical manner to the HTML environment above), but the output comes from the WML rendering layer instead of the Web rendering layer. In a Java Swing applet environment, the user executes an URL that invokes the DCA Platform in applet form. This applet, running locally on the users workstation, processes the startup request, uses the data acquisition system in an identical manner to the HTML environment above), and renders all output to the user using a Swing rendering layer. In all of these cases, the application rules encapsulated by the data acquisition system are preserved and re-used despite the differences in target platform. This provides a significant advantage to DCA users by insuring that operations (such as a create part CAD operation) is consistent, regardless of the choice of target platform by the end user.

Figure 3:
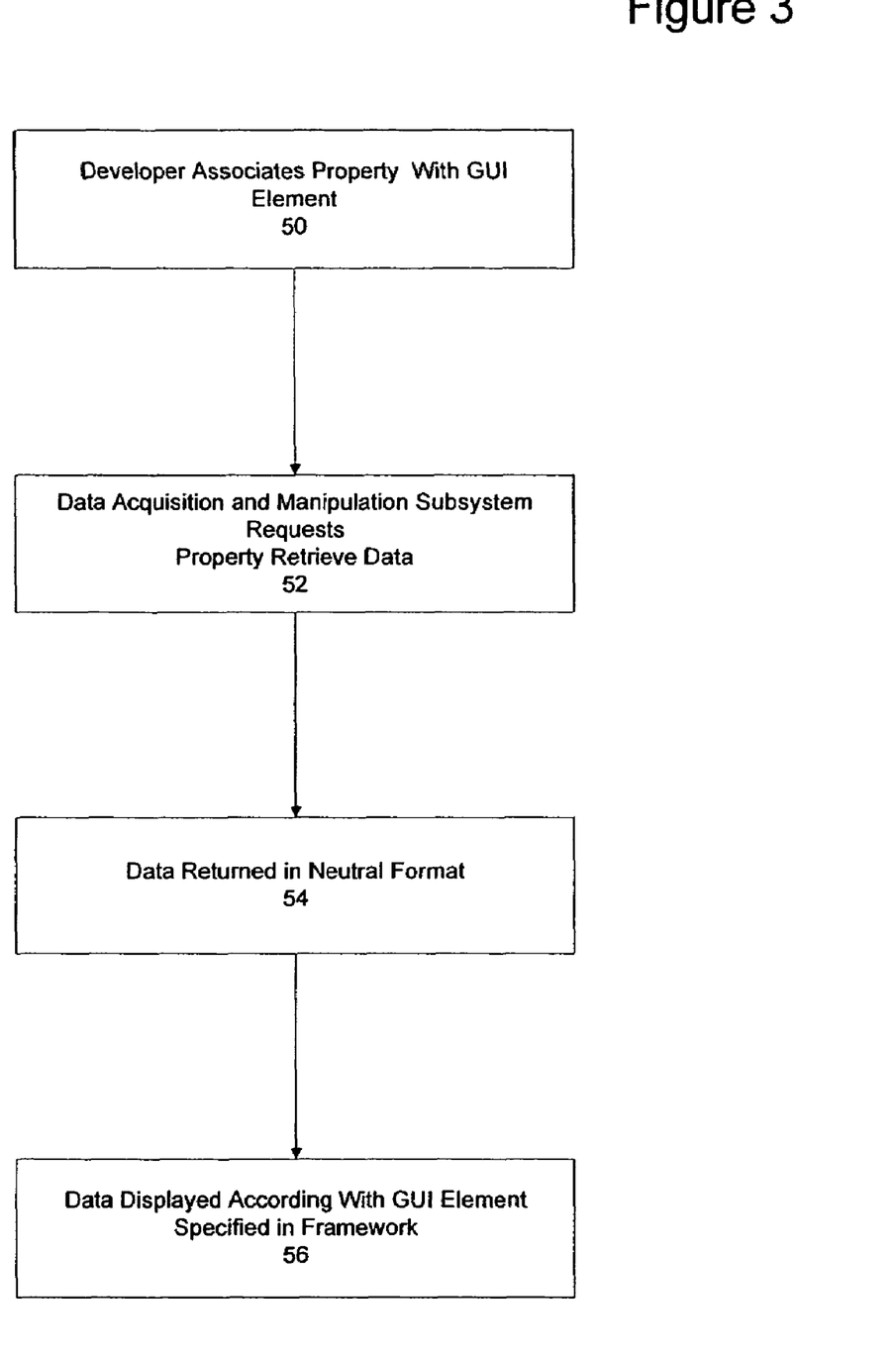
FIG. 3 depicts the sequence of steps followed by the illustrative embodiment of the present invention to generate an application appropriate rendering in a specific language based upon the identity of the client device requesting the rendering.

FIG. 3 depicts the sequence of steps followed by the illustrative embodiment of the present invention to associate object properties with GUI elements. The sequence begins when an application developer 4 associates an object property with a GUI element (step 50). The association is then stored. In the course of converting the application framework into a representation compatible with the target platform (i.e.: in converting the framework into a rendering that will execute on the requesting target device), the data acquisition and manipulation subsystem 12 requests that the object retrieve its data (step 52). When the data is returned to the data acquisition and manipulation subsystem in a neutral format (step 54), the rendering subsystem adapts the GUI in the application appropriate rendering being created to include the display element specified in the recorded association (step 56).

The use of the association of a property with a GUI element may be illustrated by reference to the name field for a part object in a CAD-related application framework. The name field is a simple string. The base DCA definition for such a field may appear as:

```
<Property id="name">
    <PropertyHandler
class="com.ptc.core.ca.web.client.property.string.
WebStringPropertyHandler"/>
    <Renderer resource="/wtcore/jsp/com/ptc/core/ca/web/property/
    string/string.jsp"/>
    <Label resource="Name:"/>
    <Need attribute="name"/>
</Property>
```

This Property is referenced during the creation of forms by adding a request to the Property as part of a LayoutRow configuration element. Role and Application IDs can be used to alter the base behavior when the Property is displayed.

```
<LayoutRow id="1">
    <Insert ref="name" mode="view" ifnot.roleId="admin"/>
    <Insert ref="name" if.roleId="admin"/>
</LayoutRow>
```

The above code forces the name property to be used strictly in view mode whenever the roleId of the user running the application is not "admin".

Figure 4:
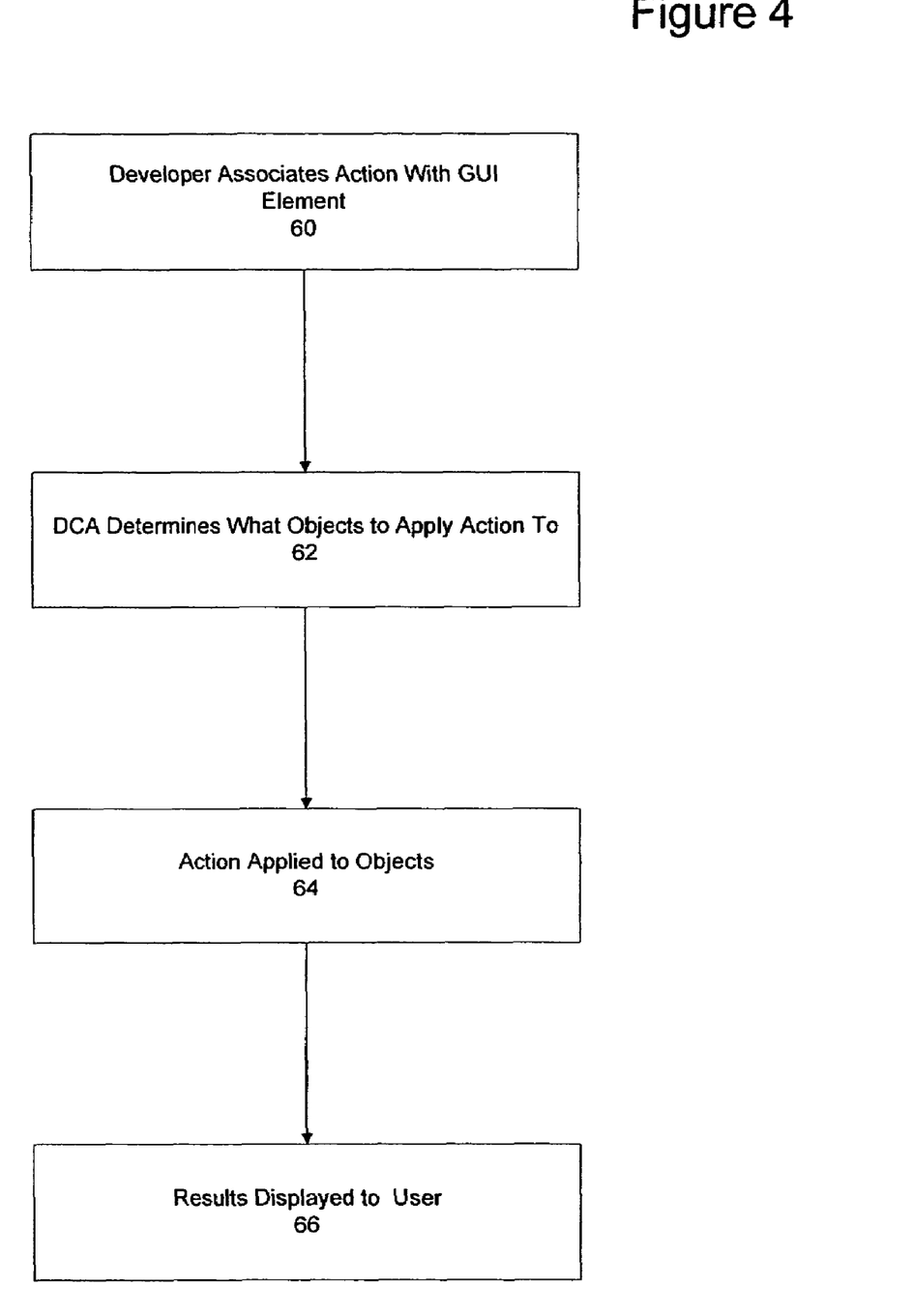
FIG. 4 depicts the sequence of steps followed by the illustrative embodiment of the present invention to associate actions with GUI elements in the application framework.

Another manner of increasing re-use of the application logic is the association of actions with display elements rather than pieces of data. The association of an action with a display element combines with the association of display elements with properties rather than data as described above to facilitate the proper action based on the GUI context. FIG. 4 depicts the sequence of steps followed by the illustrative embodiment of the present invention to associate an action with a given GUI element. The sequence begins when the application developer 4 associates an action with a particular GUI element (step 60). For example, an action may be applied to all selected items in a list, while in a table only one item is selected and acted upon. The DCA platform 2 subsequently determines what objects in the application appropriate rendering to apply the action (step 62). The action is applied to the objects (step 64) and the results are displayed for the user when the application appropriate rendering is displayed for the requesting user (step 66).

An example of the process of associating an action with a GUI element may be seen by referring to the process of producing a basic UI for a given object type in the data acquisition system. To produce a basic UI for a given object type in the data acquisition system, a create action, an edit action, a checkout action (to allow the edit action to be used), a checkin action (to allow the changes to be committed to the data acquisition system), a view details action, and a delete action are needed. Since the checkout, checkin and delete actions are the same for all objects in the data acquisition system that originate in a single back-end server, those actions are defined once and only once in a central location and re-used for multiple objects. The create, edit and view actions are defined for each object type since their data fields are not likely to be identical. This results in DCA definitions similar to the definitions shown below. The sample definition shown below illustrates the creation of the checkin, checkout and delete actions in a central area. Subsequently for a user creating a part in a CAD application, an ActionList displays a toolbar to the user to specifically define part-specific create, edit, and view actions. The delete, checkin and checkout actions from the central area are then be retrieved and inserted.

File common.xml:

```
<Repository package="com.ptc.windchill">
<Action id=action.delete>
...
</Action>
<Action id=action.checkout>
...
</Action>
<Action id=action.checkin>
...
</Action>
</Repository>
```

File part.xml:

```
<Repository package="com.ptc.windchill.part">
<ActionList id="myToolbar">
<Action id=action.create>
...
</Action>
<Action id=action.view>
...
</Action>
<Insert ref="com.ptc.windchill:action.checkout"/>
<Action id=action.edit>
...
</Action>
<Insert ref="com.ptc.windchill:action.checkin"/>
<Insert ref="com.ptc.windchill:action.delete"/>
</Repository>
```

File doc.xml:

```
<Repository package="com.ptc.windchill.doc">
<ActionList id="myToolbar">
<Action id=action.create>
...
</Action>
<Action id=action.view>
...
</Action>
<Insert ref="com.ptc.windchill:action.checkout"/>
<Action id=action.edit>
...
</Action>
<Insert ref="com.ptc.windchill:action.checkin"/>
<Insert ref="com.ptc.windchill:action.delete"/>
</Repository>
```

The illustrative embodiment of the present invention controls the display of GUI elements in an application appropriate rendering created by the developer so that display elements are varied according to the role or position of the requesting user. Various display options are selected by the developer when creating the application framework based on the role of the requesting user. The display elements may involve curtailing the display of certain elements (e.g.: the display of a single record versus the display of an entire table) or may involve a combination of visual and functional elements (e.g.: providing a handler to process a drop down menu selection for one user and disabling the option for another user). The role of the requesting user is supplied to the DCA platform 2 and the application ID is determined by the request. For example, in an HTML request, the application ID may be retrieved from the URL. The application ID-role ID pair is compared against a record stored with the application framework and the corresponding framework elements are used to create the application appropriate rendering. Those skilled in the art will recognize that the records of application ID-role ID pair may be stored separately from the application framework.

Figure 5A:
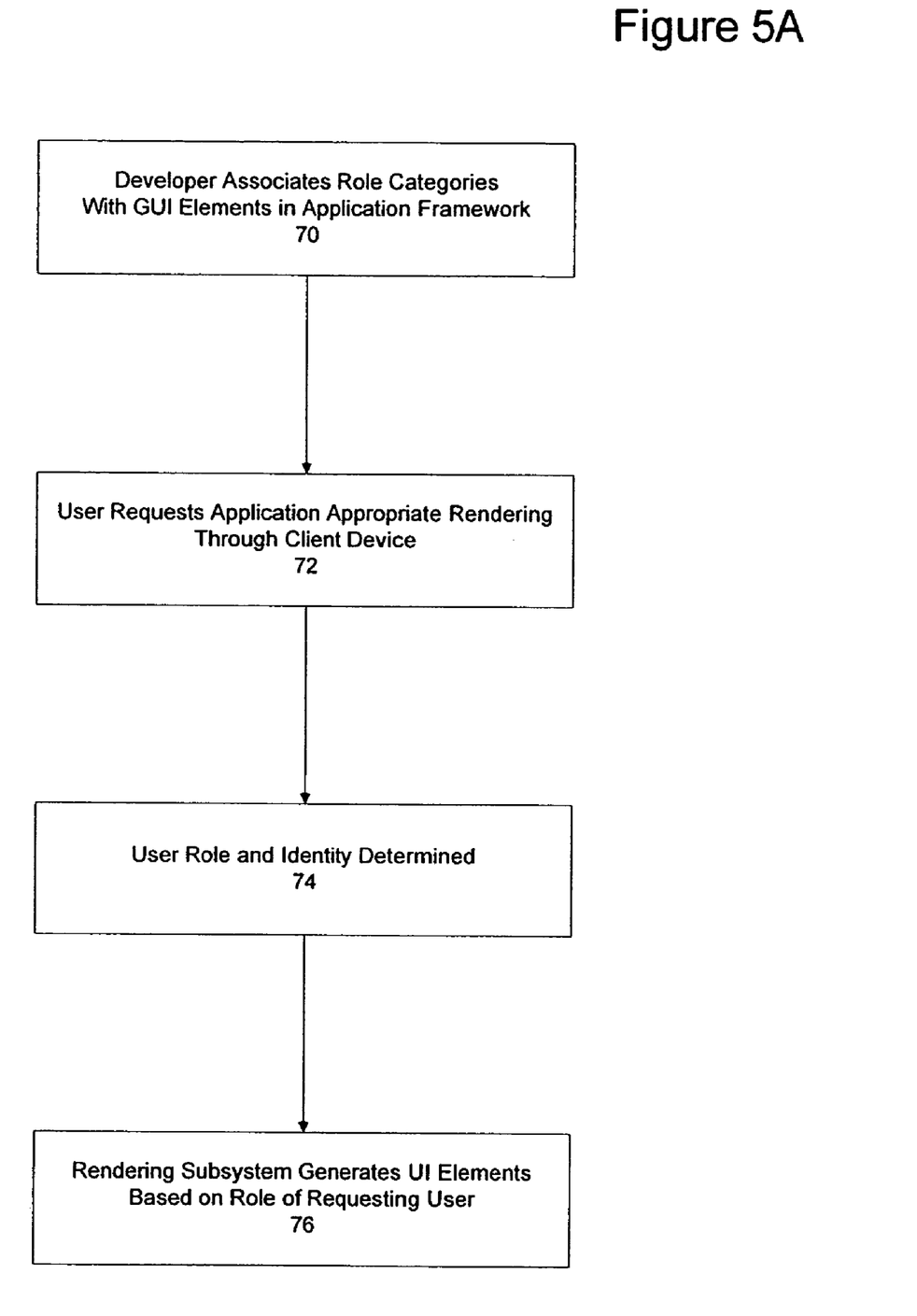
FIG. 5A depicts the sequence of steps followed by the illustrative embodiment of the present invention to control elements in the application appropriate rendering based on the role of the requesting user.

FIG. 5A depicts the sequence of steps followed by the illustrative embodiment of the present invention to vary the GUI display elements of the application appropriate rendering based upon the role of the user. The sequence begins when role categories are associated with particular GUI elements by the application developer 4 of an application framework (step 70). For example, administrators may be allowed to edit fields while regular employees may only be allowed to read fields. Alternatively, the fields may be hidden from the employees entirely. When the user 6 requests the application appropriate rendering from the DCA platform (step 72), the DCA platform determines the identity and role of the user (step 74). The DCA platform then generates the graphical user interface elements based on the role of the user and the recorded degree of access the user is allowed to the information (step 76). This approach displaying various amounts of application display elements to a user allows more customization of an application appropriate rendering than the conventional manner of allowing or denying total access to an application for a user, or allowing or denying access to discrete parts of an application.

Figure 5B:
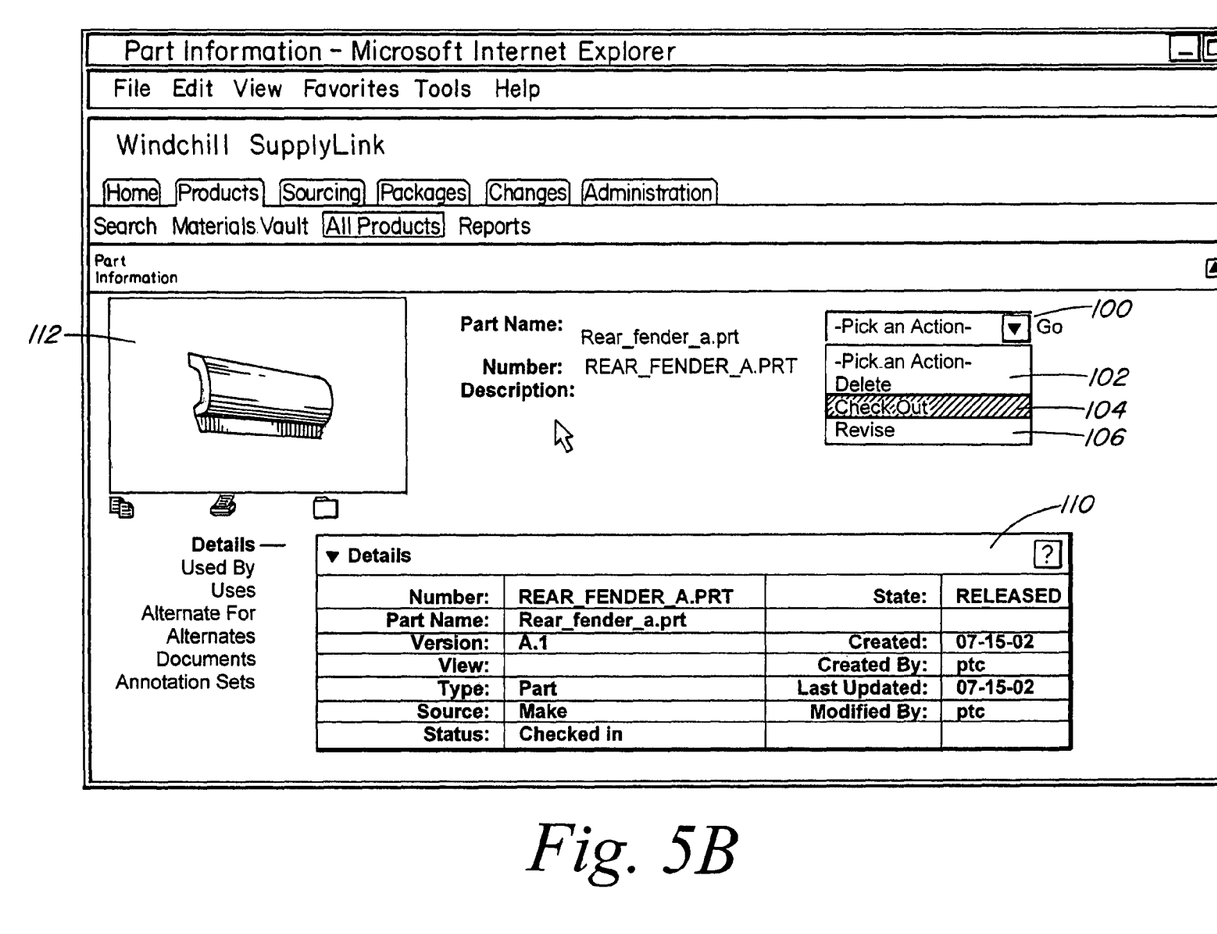
FIG. 5B depicts a a block diagram of a screenshot of an object details page from a CAD application created with the DCA platform 2 which is presented to a requesting user and may be customized according to the role of the requesting user.

FIG. 5B depicts a block diagram of a screenshot of an object details page from a CAD application appropriate rendering created with the DCA platform 2 that is presented to a requesting user. The object details page contains details of an automobile fender part. The page includes an action pulldown box with different actions "Delete" 102, "Check Out" 104, and "Revise" 106. Part details are itemized in a detail pulldown box 110 and include details such as number, part name, version, type, source, creation date, author, state, etc. A graphical representation of the model part is included in a separate area of the page 112. The information on the page may be tied to the role of the requesting user. For example, a requesting engineer may be allowed to perform the actions "Delete" 102, "Check Out 104", and "Revise" 106, on the part while a requesting salesperson may only be allowed the action "Check Out" 104. The rendering subsystem leverages the application framework to produce the page differently depending on the role of the requesting user.

Although the illustrative embodiment of the present invention has been described herein as generating an application appropriate rendering for a requesting device, those skilled in the art will recognize that many different outputs from the rendering subsystem are possible within the scope of the present invention. For example, the rendering subsystem may use the application framework to produce an executable application that is generated and transferred to a requesting device. In another example, the rendering subsystem may generate an application from the application framework, execute the application and transfer output from the application to a requesting device.

It will thus be seen that the invention attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrated flowcharts are examples and not the exclusive sequence of steps possible within the scope of the present invention.

We claim:

1. A computer-implemented application development system, comprising:
    a network-accessible storage location holding a configuration repository, the configuration repository including a plurality of elements used for defining a framework of an application in response to input, at least one of the plurality of elements associated with a role category of a user;
    a network-accessible storage location holding an application framework created from the plurality of elements in the configuration repository, the application framework being development language-neutral and including the at least one element associated with a role category of the user; and
    a computing device hosting a dynamic client architecture platform for creating requested applications, the dynamic client architecture platform used in selecting the plurality of elements in the application framework and in communication with:
        a data acquisition and manipulation subsystem for retrieving data from data storage locations and manipulating the data required by the application framework; and
        a rendering subsystem for producing an application appropriate rendering in a development language from the application framework using the data acquisition and manipulation subsystem, the application appropriate rendering generated based on a role category of a user requesting the application appropriate rendering via the dynamic client architecture platform, the rendering subsystem selected based on a programmatic examination of a request submitted by the user requesting the application appropriate rendering, the examination performed by the dynamic client architecture platform, the rendering subsystem converting the data into source code of the development language in the application appropriate rendering.

2. The system of claim 1, comprising further:
    a storage location accessible to the data acquisition and manipulation subsystem, the storage location holding data retrieved by the data acquisition and manipulation subsystem.

3. The system of claim 1 wherein the rendering subsystem is at least one of a web rendering subsystem producing a rendering appropriate for an HTML (Hyper Text Markup Language)-based application, a rendering appropriate for a C++-based application, and a rendering appropriate for a WML (Wireless Markup Language)-based application.

4. The system of claim 1 wherein the configuration repository includes definitions for elements of the framework, the elements including at least one of trees, tables, frames, property panels and wizards.

5. The system of claim 1 wherein the configuration repository is XML-based.

6. A computer-implemented method for providing an application appropriate rendering to an application development environment, the application appropriate rendering provided via a dynamic client architecture platform hosted by a computing device, the dynamic client architecture platform used to create applications in response to a user-submitted programmatic request, the method comprising:
    defining an application framework with the dynamic client architecture platform, the application framework created using a plurality of elements selected from a configuration repository, at least one of the plurality of elements associated with a role category of a user, the application framework elements being development language-neutral;
    storing the application framework;
    receiving via the dynamic client architecture platform a request for an application appropriate rendering from a user; and
    generating the application appropriate rendering using the application framework and a rendering subsystem, the application appropriate rendering generated based on a role category of the user requesting the application appropriate rendering, the rendering subsystem selected based on a programmatic examination of the request by the dynamic client architecture platform.

7. The method of claim 6, further comprising:
receiving a request from a requesting device for the application appropriate rendering in a specific development language;
retrieving data with a data acquisition and manipulation subsystem; and
creating the application appropriate rendering in the specific development language using the retrieved data.

8. The method of claim 7, further comprising:
programmatically determining the specific development language for the requested application appropriate rendering based on the type of requesting device requesting the application.

9. The method of claim 8 wherein the application appropriate rendering is a rendering appropriate for one of an HTML-based application, C++ based application and WML-based application.

10. The method of claim 6 wherein the configuration repository is XML-based.

11. The method of claim 6, further comprising:
associating a GUI (Graphical User Interface) display element with an object property in the application framework;
retrieving data referenced by the property in a language neutral manner; and
displaying the data using the GUI display element.

12. The method of claim 6, further comprising:
associating an action with a GUI (Graphical User Interface) element in the application framework; and
determining programmatically which object the action should be applied to based upon a type of the GUI element.

13. A storage medium holding computer-executable instructions for providing an application appropriate rendering to an application development environment, the application appropriate rendering provided via a dynamic client architecture platform hosted by a computing device, the dynamic client architecture platform used to create applications in response to a user-submitted programmatic request, the medium comprising:
instructions for defining an application framework with the dynamic client architecture platform, the application framework created using a plurality of elements selected from a configuration repository, at least one of the plurality of elements associated with a role category of a user, the application framework elements being development language-neutral;
instructions for storing the created application framework
instructions for receiving via the dynamic client architecture platform a request for an application appropriate rendering from a user; and
instructions for generating an application appropriate rendering using the application framework and a rendering subsystem, the application appropriate rendering generated based on a role category of the user requesting the application appropriate rendering, the rendering subsystem selected based on a programmatic examination of the request by the dynamic client architecture platform.

14. The medium of claim 13 wherein the medium further comprises:
instructions for receiving a request from a requesting device for the application appropriate rendering in a specific development language;
instructions for retrieving data with a data acquisition and manipulation subsystem and
instructions for creating the application appropriate rendering in the specific development language using the retrieved data.

15. The medium of claim 14, wherein the medium further comprises:
instructions for associating a GUI (Graphical User Interface) display element with an object property in the application framework;
instructions for retrieving data referenced by the property in a language neutral manner; and
instructions for displaying the data using the GUI display element.

16. The medium of claim 14, wherein the medium further comprises:
instructions for associating an action with a GUI (Graphical User Interface) element in the application framework; and
instructions for determining programmatically which object the action should be applied to based upon the type of the GUI element.

17. A method for providing an application appropriate rendering to an application development environment, the application appropriate rendering provided via a dynamic client architecture platform hosted by a computing device, the dynamic client architecture platform used to create applications in response to a user-submitted programmatic request, the method comprising:
defining an application framework with the dynamic client architecture platform, the application framework created using a plurality of graphical user interface (GUI) elements selected from a configuration repository, at least one of the plurality of elements associated with a role category of a user, the application framework elements being development language neutral;
storing the application framework;
receiving via the dynamic client architecture platform a request for an application appropriate rendering from a user; and
generating an application appropriate rendering using the application framework and a rendering subsystem, the application appropriate rendering generated based on a role category of a user requesting the application appropriate rendering, the rendering subsystem selected based on a programmatic examination of the request by the dynamic client architecture platform.

18. The method of claim 17, further comprising:
receiving a request from a requesting device for an application in a specific development language;
retrieving data with a data acquisition and manipulation subsystem and
creating an application in the specific development language using the retrieved data.

19. The method of claim 18 wherein the stored application framework may be used to generate an HTML-based application, a C++ based application and a WML-based application.

* * * * *